United States Patent

Schuman et al.

[11] Patent Number: 5,951,920
[45] Date of Patent: *Sep. 14, 1999

[54] PROCESS FOR PREPARING OPTICAL FIBER CLADDING SOLUTIONS

[75] Inventors: Paul D. Schuman, Hawthorne; Raja Mani; Patrick Kelly, both of Gainesville, all of Fla.

[73] Assignee: Optical Polymer Research, Inc., Gainesville, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/879,639

[22] Filed: Jun. 20, 1997

[51] Int. Cl.$^6$ ............... F21V 9/00; G02B 6/00; G02B 6/02
[52] U.S. Cl. ............... 252/582; 38/144; 38/123
[58] Field of Search ............... 252/582, 585; 385/144, 123; 526/247

[56] References Cited

U.S. PATENT DOCUMENTS

| | | | |
|---|---|---|---|
| 4,469,724 | 9/1984 | Klinger | 427/513 |
| 4,511,209 | 4/1985 | Skutnik | 385/145 |
| 4,617,350 | 10/1986 | Maeda et al. | 525/153 |
| 5,024,507 | 6/1991 | Minns et al. | 385/145 |
| 5,210,248 | 5/1993 | Babirad et al. | 556/420 |
| 5,230,840 | 7/1993 | Nishiguchi et al. | 385/145 |
| 5,239,026 | 8/1993 | Babirad et al. | 252/582 |
| 5,314,975 | 5/1994 | Babirad et al. | 526/248 |
| 5,373,576 | 12/1994 | Minns et al. | 385/125 |
| 5,484,822 | 1/1996 | Minns et al. | 522/35 |
| 5,492,987 | 2/1996 | Minns et al. | 526/245 |
| 5,534,558 | 7/1996 | Minns et al. | |
| 5,690,863 | 11/1997 | Schuman | 252/582 |

OTHER PUBLICATIONS

Takayuki Otsu—1984—Living Mono–and Biradical Polymerizations In Homogeneous System Synthesis of AB and ABA Type Block Copolymers.

Takayuki Otsu—1984—Polymer Design by Iniferter Technique in Radical Polymerization Synthesis of AB and ABA Block Copolymers.

T. Otsu, T. Matsunaga—1989—Living Radical Polymerization Through The Use Of Iniferters: Controlled Synthesis Of Polymers.

Takayuki Otsu—1982—Living Radical Polmerizations in Homogeneous Solution by Using Organic Sulfides as Photoiniferters.

Takayuki Otsu—1984—Living Radical Polymerization in Homogeneous System by Using Iniferter: Design of Block Copolymers.

*Primary Examiner*—Shean C. Wu
*Attorney, Agent, or Firm*—Larson & Larson, P.A.; James E. Larson

[57] ABSTRACT

A process for preparing optical fiber cladding solutions starting with a monomer having the formula $$CH_2=C(R)COOCHXY$$

where
R is H or methyl;
X is H or $CF_3$,
Y is H or $CF_3$ provided that when X is H, Y is $—CF_3$, $—CF(CF_3)OCF_2CF(CF_3)OC_4F_9$ or $—(CF_2)_nZ$,
Z is F or H; and
n is 1 to 8.

The monomers are subjected to UV light at about 1–400 nm for one to four hours until a cladding solution of desired viscosity is obtained.

6 Claims, No Drawings

PROCESS FOR PREPARING OPTICAL FIBER CLADDING SOLUTIONS

PRIOR APPLICATION

This application relates to U.S. patent Ser. No. 08/644,352 now U.S. Pat. No. 5,690,863, filed May 10, 1996, which is a continuation-in-part from U.S. application Ser. No. 08/279,161, filed Jul. 22, 1994, now abandoned.

FIELD OF THE INVENTION

This invention relates to curable compositions for coating optical fibers. In particular, it refers to 100% UV curable optical fiber cladding solutions produced by a one step polymerization process.

BACKGROUND OF THE INVENTION

Step index silica/glass as well as plastic optical fibers are generally composed of two or more materials, but primarily composed of a core having a higher refractive index than an outer, transparent, lower refractive index cladding material. This low refractive index cladding material improves the light carrying ability or efficiency of the fiber by preventing the escape of light from the core. The larger the difference in the refractive index between the core and the outer coating the greater the luminous properties of the fiber.

A measure of this light trapping efficiency is called the "Numerical Aperture", NA of a coated optical fiber. The angle at which a light ray may enter a fiber core and be propagated down the fiber without penetrating the surface of the core is termed the critical angle. This angle, and the fiber/cladding light trapping efficiency may be calculated from the respective refractive indices of the core and the cladding material as $(n^2_1-n^2_2)^{1/2}=NA$, where $n_1$ and $n_2$ are the refractive indices of the core and cladding respectively and NA is the Numerical Aperture. The $Sine^{-1}$ NA is the critical angle, $A_c$, and the angle of the cone of light that may enter a fiber without penetrating the surface of the core is the acceptance angle $2A_c$.

Thus, the larger the difference in the refractive index of the core versus the cladding material the greater the light gathering and trapping efficiency of the optical fiber.

In arriving at a suitable polymer for cladding an optical fiber it is readily apparent, from a summation of the atomic contribution to molar refraction of organic compounds that polymers containing fluorine, in place of hydrogen, would yield the lowest attainable refractive index. For example, fluorine has a molar refraction of 0.81 and hydrogen 1.028, see "Handbook of Chemistry and Physics, Chemical Rubber Publishing Co." From this type of calculation one would assume that commercially available polyfluorovinyl polymers would be the polymers of choice for low refractive index cladding materials. However, it has been found that the commercially available fluoro-polymers in general have high scattering losses. These losses are generally attributable to polymer crystallinity. For example, semi-crystalline fluoropolymers are typically translucent to opaque solids with scattering losses near $10^6$ dB/km. (L. Blyer Et. al. "Optical Fiber Telecommunications". E. S. Miller and A. Chynoweth, Academic Press, Inc. New York, 1979, 300–339).

Although numerous fluorine-containing polymer systems have been reported and/or patented as low refractive index cladding polymers the predominant, and most useful polymers to date are acrylate and methacrylate esters of fluorine-containing alcohols.

A secondary, but very important, purpose served by a cladding composition is to act as a protective coating on the surface of the optical fiber core to prevent silica-silica fiber abrasion. This is especially true for pure silica fibers which deteriorate rapidly when exposed to atmospheric moisture after being drawn from molten silica. It is important then to provide a protective cladding, which is most conveniently done with polymeric materials. In addition to lowering the refractive index, incorporation of fluorine into a cladding polymer structure also imparts an additional desirable, moisture barrier property, (L. Klinger; J. Mater. Res 2(6), Nov./Dec. 1987).

Because of the low viscosity and high volatility of the lower molecular weight fluorocarbon acrylate or methacrylate monomers, under normal circumstances, they cannot be conveniently used directly for cladding purposes. As a consequence, higher boiling acrylate esters of polyfluoro alcohols are currently used, such as in the Skutnik U.S. Pat. No. 4,511,209, where the higher boiling, 1H, 1H, 11H-eicosafluoroundecylacrylate, boiling at ~290° C. at atmospheric pressure, is used in UV curable cladding compositions. Because of the low Tg of the corresponding homopolymer a considerable amount of a trifunctional cross linking monomer is required to obtain a rigid polymer. Trimethylolpropyltriacrylate is recommended, at from 5.7 to 26.7%, in order to produce a hard cladding polymer, as claimed in the patent. The polymer containing 26.7% cross linker had a NA of 0.2 when polymerized on a quartz fiber. Comparatively, in this current invention, pure cladding polymers and copolymers can be produced from even the lowest boiling monomers, such as 2,2,2-trifluoroethyl acrylate, bp~100° C. at atmospheric pressure and 2,2,2-trifluoroethyl methacrylate, bp~112° C. at atmospheric pressure and the Polymer has a refractive index of 1.418 with a corresponding NA on a quartz fiber of 0.34.

U.S. Pat. No. 5,024,507, Jun. 18, 1991, to R. Minns, describes the use of copolymers of vinylidene fluoride and hexafluoropropylene (Fluorel, from 3M Co., U.S. Pat. No. 2,968,649, Jan. 16, 1961) and ter-polymers of vinylidene fluoride, hexafluoropropylene and tetrafluoroethylene, also from 3M, as viscosity modifying polymers. These polymers are apparently soluble in the cladding composition of fluorocarbon acrylate and diacrylate monomers used in their UV curable cladding solutions.

In the above mentioned Minns' patent and similar to the Skutnik patent the composition is composed of a 10% concentration of a cross linking monomer of a diacrylate ester of a long chain fluorocarbon diol, having low volatility, obtainable from the 3M Co. The resulting polymer is still elastomeric. A need exists for a simple low cost process for making optical fiber cladding solutions with an easily adjustable viscosity and refractive index.

SUMMARY OF THE INVENTION

Cladding solutions are prepared in this invention in a one step process directly from a fluorocarbon or hydrocarbon acrylate or a methacrylate monomer to give an easily controllable viscosity and easily controllable low refractive index between 1.3 to 1.5. These solutions are 100% UV photocurable cladding polymer solutions. The monomers are irradiated in a nitrogen purged UV transparent chamber with UV light of approximately 2500 micro watts/$cm^2$ at between 1–400 nm until a desired solution viscosity is obtained. The UV cured cladding polymers made from the solution are crystal clear, having a predesigned shore A or D hardness and toughness obtainable through acrylate/methacrylate copolymerization. Hydrocarbon cross linking monomers used at 0.5 to 3.0% by weight in cladding solution made in accordance with the process are sufficient to provide adequate crosslinked polymers without any significant change in refractive index.

DETAILED DESCRIPTION OF THE INVENTION

The process for manufacturing 100% UV curable cladding polymer solutions according to the present invention are prepared directly from degassed, inhibitor free monomer(s) with the addition of a UV initiator, and if required, the addition of an adhesion promoter to the monomer(s) mixture to promote adhesion to glass/quartz. This mixture is irradiated, in a nitrogen purged, suitable UV transparent container, with low intensity UV light, of approximately 2,500 micro Watts/cm$^2$, at between 1 to 400 nm but preferably at about 350 nm.

Irradiation may be intermittent or continuous and is terminated when a desired viscosity is attained. At this time the final polymer properties may be modified by the addition of a cross linking monomer such as a di- or polyfunctional hydrocarbon or polyfluorocarbon di-acrylate or di-methacrylate ester(s), to produce an infusible cladding polymer or a thermoplastic cladding polymer may be produced by omitting the cross linking monomers.

After application to an optical fiber or other surface and exposed to a high intensity UV source the cladding solution will rapidly polymerize to a solid polymer having a specifically designed modulus, refractive index and shore A or D hardness.

The fluorocarbon monomers employed have the general formula $CH_2=C(R)COOCHXY$ where:

R can be hydrogen or methyl;

X can be —$CF_3$ or hydrogen;

Y can be hydrogen or $CF_3$ and when X is hydrogen then Y can be $CF_3$, —$CF(CF_3)OCF_2CF(CF_3)O(CF_2)_4F$ or —$(CF_2)_nZ$;

Z can be fluorine or hydrogen;

and n can be 1 to 8.

The preferred fluorocarbon acrylate and methacrylate monomer(s) used in the process of this invention are:

t-butylacrylate
n-butylmethacrylate
n-butylacrylate

If the formulation is to be used for application to glass or quartz an adhesion promoter is added to the initial formulation. There are numerous adhesion promoters commonly used in the glass composite industry that are commercially available from PCR Gainesville, Fla. and Huls America, Summerset, N.J. and many others. Typical adhesion promoters for glass are acrylic acid and methacrylic acid, glycidyl methacrylate and 3-(trimethoxysilyl) propyl methacrylate. Cladding bond strength is determined by cementing, with the cladding composition, the ends of two 1×0.25 inch heat treated silica rods, in an inert atmosphere, followed by UV cure and determining tensile strength of the bond. Typical bond strength is 1900 lbs. per square inch.

Photoinitiators for use in this process for UV curing are well known in the art. Typical examples of initiators that can be used are 2-hydroxy- 2-methylpropiophenone; 1-hydroxycyclohexyl phenyl ketone and p-xylene bis (N,N-diethyldithiocarbamate). The UV initiator is dissolved in the monomer solution followed by UV irradiation to polymerize the mixture rapidly in accordance with this inventive process.

Any monomer initiated with the UV initiator that results in a soft, tacky elastomer can be cross linked to increase the toughness of the elastomer. Cross linking agents that are useful in this process are ethyleneglycoldiacrylate, ethyleneglycol dimethacrylate, tetra(ethyleneglycol) dimethacrylate, tetra(ethyleneglycol)diacrylate, trimethylolpropane trimethacrylate, trimethylolpropane triacrylate, 2,2,3,4,4-hexafluoropentandiyl-1,5-bis(methacrylate), 2,2,3,4,4-hexafluoropentandiyl-1,5-bis(acrylate), $CH_2=CHOCOCH_2-(C_2F_4O)_m-(CF_2O)_n$

| CHEMICAL STRUCTURE | CHEMICAL NAME | REFRACTIVE INDEX OF MONOMER |
|---|---|---|
| $CH_2=C(H)COOCH_2CF_3$ | 1H,1H-TRIFLUOROETHYL ACRYLATE | 1.3506 |
| $CH_2=C(CH_3)COOCH_2CF_3$ | 1H,1H-TRIFLUOROETHYL METHACRYLATE | 1.3624 |
| $CH_2=C(H)COOCH_2CF_2CF_2H$ | 1H,1H,3H-TETRAFLUOROPROPYL ACRYLATE | 1.3629 |
| $CH_2=C(CH_3)COOCH_2CF_2CF_2H$ | 1H,1H,3H-TETRAFLUOROPROPYL METHACRYLATE | 1.3738 |
| $CH_2=C(H)COOCH(CF_3)_2$ | 2H-HEXAFLUOROISOPROPYL ACRYLATE | 1.3164 |
| $CH_2=C(CH_3)COOCH(CF_3)_2$ | 2H-HEXAFLUOROISOPROPYL METHACRYLATE | 1.3295 |
| $CH_2=C(H)COOCH_2(CF_2)_3F$ | 1H,1H,HEPTAFLUOROBUTYL ACRYLATE | 1.3289 |
| $CH_2=C(CH_3)COOCH_2(CF_2)_3F$ | 1H,1H-HEPTAFLUOROBUTYL METHACRYLATE | 1.3407 |
| $CH_2=C(H)COOCH_2(CF_2)_4H$ | 1H,1H,5H-OCTAFLUOROPENTYL ACRYLATE | 1.3467 |
| $CH_2=C(CH_3)COOCH_2(CF_2)_4H$ | 1H,1H,5H-OCTAFLUOROPENTYL METHACRYLATE | 1.3559 |
| $CH_2=C(H)COOCH_2(CF_2)_7F$ | 1H,1H-PENTADECAFLUOROOCTYL ACRYLATE | 1.328 |
| $CH_2=C(CH_3)COOCH_2(CF_2)_7F$ | 1H,1H-PENTADECAFLUOROOCTYLMETHACRYLATE | 1.332 |
| $CH_2=C(H)COO(CH_2)_2(CF_2)_8F$ | 1H,1H,2H,2H-HEPTADECAFLUORODECYL ACRYLATE | 1.3380 |
| $CH_2=C(CH_3)COO(CH_2)_2(CF_2)_8F$ | 1H,1H,2H,2H-HEPTADECAFLUORODECYL METHACRYLATE | 1.3435 |
| $CH_2=C(H)COOCH_2CF(CF_3)OCF_2CF(CF_3)O(CF_2)_4F$ | From 3M L-12044 | 1.311 |
| $CH_2=C(CH_3)COOCH_2CF(CF_3)OCF_2CF(CF_3)O(CF_2)_4F$ | From 3M L-12043 | 1.315 |

If desired, the refractive index of the above polymers may be increased by blending in monomers having a higher refractive index. Useful hydrocarbon monomers and comonomers used to modify the refractive index as well as physical properties of optical cladding polymers are:
methylmethacrylate
ethylmethacrylate
ethylacrylate
isopropylmethacrylate
isopropylacrylate
n-propylmethacrylate
n-propylacrylate
isobutylmethacrylate
isobutylacrylate
t-butylmethacrylate $CH_2OCOCH=CH_2$ where m/n=0.8, and $[CH_2=CHOCOCH_2-CF(CF_3) O\{CF(CF_3)CF_2O\}_2C_2F_4]_2$.

Cladding solutions of this process are prepared in a one step process directly from the monomer resulting in an easily controllable viscosity and easily controllable refractive index with a result of 100% photocurable cladding polymer solution. The UV cladding polymers made from these solutions are crystal clear having a predesigned A or D hardness and toughness obtainable through acrylate/methacrylate copolymerization.

The following example sets forth the process of this invention.

EXAMPLE 1

Trifluoroethylacrylate monomer is washed with an aqueous base solution to remove polymerization inhibitors such as hydroquinone or methoxy hydroquinone. The monomer is then degassed and transferred to a nitrogen purged container transparent to UV light and having a known internal UV intensity in the 350 nm region. 0.5% by weight UV initiator of 1-hydroxycyclohexyl phenyl ketone is mixed with the monomer. If required for adhesion to glass, 2.0% by weight of an adhesion promoter is added; namely, 3-(trimethoxylsilyl) propyl methacrylate is added with mixing. The mixture is exposed to UV light in the 350 nm region for approximately 1 and ½ hours until a viscosity of approximately 800 cSt is obtained. If desired, a cross linking agent such as ethyleneglycol dimethacrylate is added prior to the final UV curing of the polymer to produce a cross linked infusible cladding polymer. The following Tables 1, 2 and 3 set forth additional examples for the preparation of the polymers and copolymers derived from the process of this invention.

TABLE 1

Polymer Examples A to L

| Component | A | B | C | D | E | F | G | H | I | J | K | L |
|---|---|---|---|---|---|---|---|---|---|---|---|---|
| Trifluoroethyl Acrylate | 48.0 | 48.0 | — | — | — | — | — | — | — | — | — | — |
| Trifluoroethyl Methacrylate | 48.0 | 48.0 | 48.0 | 48.0 | — | — | — | — | — | — | — | — |
| Tetrafluoropropyl Methacrylate | — | — | — | — | 48.0 | 38.4 | 28.8 | 19.2 | — | — | — | — |
| Hexafluoroisopropyl Acrylate | — | — | — | 48.0 | 48.0 | 57.6 | 67.2 | 76.8 | — | 28.8 | 38.4 | 48.0 |
| Heptafluorobutyl Acrylate | — | — | — | — | — | — | — | — | 38.4 | — | — | — |
| Heptafluorobutyl Methacrylate | — | — | — | — | — | — | — | — | 57.6 | 67.2 | 57.6 | 48.0 |
| Acrylic Acid | — | — | 2.0 | 2.0 | 2.0 | 2.0 | 2.0 | 2.0 | 2.0 | 2.0 | 2.0 | 2.0 |
| Methacrylic Acid | — | 2.0 | — | — | — | — | — | — | — | — | — | — |
| 3-Methoxylsilylpropyl Methacrylate | 2.0 | — | — | — | — | — | — | — | — | — | — | — |
| Ethyleneglycol Dimethacrylate | 1.0 | 1.0 | 1.0 | 1.0 | 1.0 | 1.0 | 1.0 | 1.0 | 1.0 | 1.0 | 1.0 | 1.0 |
| 1-Hydroxycyclohexyl phenyl ketone | 0.5 | 0.5 | 0.5 | 0.5 | 0.5 | 0.5 | 0.5 | 0.5 | 0.5 | — | — | — |
| 2-Hydroxy 2-methyl Propiophenone | — | — | — | — | — | — | — | — | — | 0.5 | 0.5 | 0.5 |
| p-Xylenebis(N,N-diethyldithio carbamate) | 0.5 | 0.5 | 0.5 | 0.5 | 0.5 | 0.5 | 0.5 | 0.5 | 0.5 | 0.5 | 0.5 | 0.5 |
| Polymer Refractive Index | 1.415 | 1.417 | 1.405 | 1.385 | 1.390 | 1.385 | 1.377 | 1.365 | 1.388 | 1.37 | 1.377 | 1.376 |
| Calculated NA for cladding on quartz | 0.35 | 0.34 | 0.40 | 0.46 | 0.44 | 0.46 | 0.48 | 0.51 | 0.45 | 0.48 | 0.48 | 0.4 |

TABLE 2

Polymer Examples A to L

| Component | A | B | C | D | E | F | G | H | I | J | K | L |
|---|---|---|---|---|---|---|---|---|---|---|---|---|
| Trifluoroethyl Acrylate | — | — | — | — | — | — | — | — | — | — | 57.6 | 38.4 |
| Trifluoroethyl Methacrylate | — | — | 48.0 | — | — | — | — | — | — | — | 38.4 | 57.6 |
| Tetrafluoropropyl Methacrylate | — | 48.0 | — | — | — | — | — | — | — | — | — | — |
| Hexafluoroisopropyl Acrylate | 96.0 | 48.0 | 48.0 | 57.6 | 67.2 | — | — | — | 48.5 | 97.0 | — | — |
| Heptafluorobutyl Acrylate | — | — | — | — | — | 48.0 | 38.4 | 28.8 | — | — | — | — |
| Heptafluorobutyl Methacrylate | — | — | — | 38.4 | 28.8 | 48.0 | 7.6 | 67.2 | 48.5 | — | — | — |
| Acrylic Acid | 2.0 | 2.0 | 2.0 | 2.0 | 2.0 | 2.0 | 2.0 | 2.0 | 2.0 | 2.0 | 2.0 | 2.0 |
| 3-(Methoxysilyl) Propyl Methacrylate | — | — | — | — | — | — | — | — | — | — | — | — |
| Ethyleneglycol Dimethacrylate | 1.0 | — | — | — | — | — | — | — | — | — | — | — |
| Trimethylolpropane Triacrylate | — | 1.0 | 1.0 | 1.0 | 1.0 | 1.0 | 1.0 | 1.0 | — | — | 1.0 | 1.0 |
| 2-Hydroxy 2-methyl Propiophenone | 1.0 | 1.0 | 1.0 | 1.0 | 1.0 | 1.0 | 1.0 | 1.0 | 1.0 | 1.0 | 1.0 | 1.0 |
| Polymer Refractive Index | 1.374 | 1.386 | 1.388 | 1.373 | 1.372 | 1.380 | 1.388 | 1.388 | 1.372 | 1.37 | 1.413 | 1.415 |
| Calculated NA for cladding on quartz | 0.49 | 0.45 | 0.45 | 0.49 | 0.49 | 0.47 | 0.45 | 0.45 | 0.49 | 0.50 | 0.36 | 0.35 |

TABLE 3

Polymer Examples A–J

| Component | A | B | C | D | E | F | G | H | I | J |
|---|---|---|---|---|---|---|---|---|---|---|
| n-Butyl methacrylate | 97.5 | 97.5 | — | 92.5 | 90.5 | 92.5 | 90.5 | 92.5 | 90.5 | — |
| Methyl Methacrylate | — | — | 99.5 | — | — | — | — | — | — | 69.7 |
| 2,2,2-Trifluoroethyl Methacrylate | — | — | — | — | — | — | — | — | — | 29.7 |
| (3-Methoxysilyl) Propyl Methacrylate | — | — | — | 5.0 | 5.0 | 5.0 | 5.0 | 5.0 | 5.0 | — |
| Ethyleneglycol Dimethacrylate | 2.0 | — | — | 2.0 | 4.0 | — | — | 2.0 | 4.0 | — |
| Trimethylolpropane Triacrylate | — | 2.0 | — | — | — | — | — | — | — | — |
| Tetraethyleneglycol Dimethacrylate | — | — | — | — | — | 2.0 | 4.0 | — | — | — |
| 2-Hydroxy, 2-methyl Propiophenone | 0.5 | 0.5 | 0.5 | 0.5 | 0.5 | 0.5 | 0.5 | 0.5 | 0.5 | 0.5 |
| Polymer Refractive Index | 1.475 | 1.482 | 1.492 | 1.474 | 1.476 | 1.473 | 1.478 | 1.474 | 1.479 | 1.470 |

Equivalent chemical substances can be substituted in the process of this invention to obtain the same results in the same way.

We claim:

1. A process for producing an optical fiber cladding solution capable of producing a polymer with a refractive index from 1.33 to 1.5, the process consisting essentially of:

(a) providing a monomer of the formula $CH_2=C(R)COOCHXY$ wherein

R is selected from the group consisting of hydrogen and methyl;

X is selected from the group consisting of hydrogen and $-CF_3$;

Y is selected from the group consisting of hydrogen and $CF_3$ and when X is hydrogen then Y is selected from the group consisting of
   $[-CH_2(CF_3)CFOCF_22CF(CF_3)O(CF_2)_4F$, and $(CF_2)_nZ;]-CF_3$, $-CF(CF_3)OCF_2CF(CF_3)OC_4F_9$, and $(CF_2)_nZ$;

Z is selected from the group consisting of fluorine and hydrogen; and n is 1 to 8;

(b) admixing a photoinitiator with the monomer of step (a); and (c) exposing the monomer of (b) to a UV light at 1 to 400 nm for one to four hours until a desired viscosity is obtained.

2. A process according to claim 1 wherein the monomer is selected from the group consisting of 1H, 1H-trifluoroethyl acrylate,
   1H, 1H-trifluoroethyl methacrylate,
   1H, 1H, 3H-tetrafluoropropyl acrylate,
   1H, H, 3H-tetrafluoropropyl methacrylate,
   2H-hexafluoroisopropyl acrylate,
   2H-hexafluo roispropyl methacrylate,
   1H,1H-heptafluorobutyl acrylate,
   1H,1H-heptafluorobutyl methacrylate,
   1H,1H,5H-octafluoropentyl acrylate,
   1H,1H,5H-octafluoropentyl methacrylate,
   1H,1H,2H,2H,-heptadecafluorodecyl acrylate,
   1H,1H,2H,2H-heptadecafluorodecyl methacrylate,
   1H,1H-pentadecafluorooctyl acrylate,
   1H,1H-pentadecafluorooctyl methacrylate,
   $CH_2=C(H)COOCH_2CF(CF_3)OCF_2CF(CF_3)O(CF_2)_4F$
   $CH_2=C(CH_3)COOCH_2CF(CF_3)OCF_2CF(CF_3)O(CF_2)_4F$.

3. The process according to claim 1 wherein an adhesion promotor is admixed with the monomer before step (b).

4. The process according to claim 1 wherein a cross linking monomer is admixed after step (c) with the irradiated cladding solution and the solution is UV cured on silica or glass.

5. The process according to claim 1 wherein a cross linking agent is admixed with the irradiated cladding solution after step (c) and the solution is UV cured on quartz.

6. The process according to claim 4 wherein the cross linking monomer is selected from the group consisting of ethyleneglycoldiacrylate, ethyleneglycol dimethacrylate, tetra(ethyleneglycol)dimethacrylate, tetra(ethyleneglycol)diacrylate, trimethylolpropane trimethacrylate, trimethylolpropane triacrylate, 2,2,3,4,4-hexafluoropentandiyl-1,5-bis(methacrylate), 2,2,3,4,4-hexafluoropentandiyl-1,5-bis(acrylate), $CH_2=CHOCOCH_2-(C_2F_4O)_m-(CF_2O)_nCH_2OCOCH=CH_2$ where m/n=0.8, and $[CH_2=CHOCOCH_2-CF(CF_3)O\{CF(CF_3)CF_2O\}_2C_2F_4]_2$.

* * * * *